US011760053B2

(12) United States Patent
Yamane et al.

(10) Patent No.: US 11,760,053 B2
(45) Date of Patent: Sep. 19, 2023

(54) PREPREG, PREPREG LAMINATE, AND FIBER-REINFORCED COMPOSITE MATERIAL

(71) Applicant: Toray Industries, Inc., Tokyo (JP)

(72) Inventors: Takuya Yamane, Ehime (JP); Narumichi Sato, Ehime (JP); Shiori Kawamoto, Ehime (JP); Miyuki Tabayashi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 138 days.

(21) Appl. No.: 17/267,621

(22) PCT Filed: Sep. 11, 2019

(86) PCT No.: PCT/JP2019/035730
§ 371 (c)(1),
(2) Date: Feb. 10, 2021

(87) PCT Pub. No.: WO2020/059599
PCT Pub. Date: Mar. 26, 2020

(65) Prior Publication Data

US 2021/0309819 A1 Oct. 7, 2021

(30) Foreign Application Priority Data

Sep. 18, 2018 (JP) ................................ 2018-173279

(51) Int. Cl.
*C08J 5/24* (2006.01)
*B32B 5/02* (2006.01)
(Continued)

(52) U.S. Cl.
CPC ................ *B32B 5/024* (2013.01); *B32B 5/26* (2013.01); *C08J 5/042* (2013.01); *C08J 5/243* (2021.05);
(Continued)

(58) Field of Classification Search
CPC ....... B32B 5/024; B32B 5/26; B32B 2250/20; B32B 2260/023; B32B 2260/046; C08L 63/00
See application file for complete search history.

(56) References Cited

U.S. PATENT DOCUMENTS 4,753,847 A * 6/1988 Wilheim ................ B29C 33/62 428/479.6
6,139,942 A 10/2000 Hartness et al.
(Continued)

FOREIGN PATENT DOCUMENTS

JP 01104624 A 4/1989
JP 0232843 A 2/1990
(Continued)

OTHER PUBLICATIONS

Supplementary European Search Report for European Application No. 19 861 927.2, dated Apr. 25, 2022, 8 pages.
(Continued)

*Primary Examiner* — Callie E Shosho
*Assistant Examiner* — Bethany M Miller
(74) *Attorney, Agent, or Firm* — RATNERPRESTIA

(57) ABSTRACT

A prepreg which is suitable for producing a fiber-reinforced composite material in a short period of time without using an autoclave, can produce a fiber-reinforced composite material in which the occurrence of voids is suppressed and excellent impact resistance is achieved, and has excellent handling properties; and a fiber-reinforced composite material using the prepreg. This prepreg is a prepreg in which a reinforcing fiber [A] arranged in layers is partially impregnated with an epoxy resin composition containing an epoxy resin [B] and a curing agent [C], wherein the impregnation rate φ is 30-95%, and a thermoplastic resin [D] insoluble in the epoxy resin [B] is unevenly distributed on both surfaces of the prepreg. In addition, in the layers of the reinforcing fiber
(Continued)

[A], epoxy resin composition-unimpregnated portions are localized on one surface of the prepreg, and the localization parameter a, which defines the degree of localization, is in the range of $0.10<\sigma<0.45$.

11 Claims, 5 Drawing Sheets

(51) Int. Cl.
*B32B 5/26* (2006.01)
*C08L 63/00* (2006.01)
*C08J 5/04* (2006.01)

(52) U.S. Cl.
CPC ............... *C08J 5/249* (2021.05); *C08L 63/00* (2013.01); *B32B 2250/20* (2013.01); *B32B 2260/023* (2013.01); *B32B 2260/046* (2013.01); *B32B 2262/0261* (2013.01); *B32B 2262/106* (2013.01); *C08J 2300/22* (2013.01); *C08J 2363/02* (2013.01); *C08J 2377/04* (2013.01); *C08J 2400/22* (2013.01); *C08J 2463/00* (2013.01)

(56) References Cited

U.S. PATENT DOCUMENTS

2014/0309336 A1* 10/2014 Hughes .................... B32B 5/30
523/427
2016/0083542 A1 3/2016 Cleaver
2018/0002504 A1 1/2018 Kawamoto et al.
2019/0210301 A1 7/2019 Naito et al.
2020/0010632 A1 1/2020 Watari et al.

FOREIGN PATENT DOCUMENTS

JP 0269566 A 3/1990
JP 04292634 A 10/1992
JP 10231372 A 9/1998
JP 2007276249 A 10/2007
JP 2015515502 A 5/2015
WO 9416003 A1 7/1994
WO 2018003694 A1 1/2018
WO 2018181254 A1 10/2018

OTHER PUBLICATIONS

International Search Report and Written Opinion for international Application No. PCT/JP2019/035730, dated Dec. 3, 2019, 4 pages.

* cited by examiner

[Expression 1]
$$K = \frac{2\mu L Q_a}{A_P}\left(\frac{P_a}{P_a^{\,2} - P_v^{\,2}}\right) \qquad \text{Expression (1)}$$
[Fig 1]
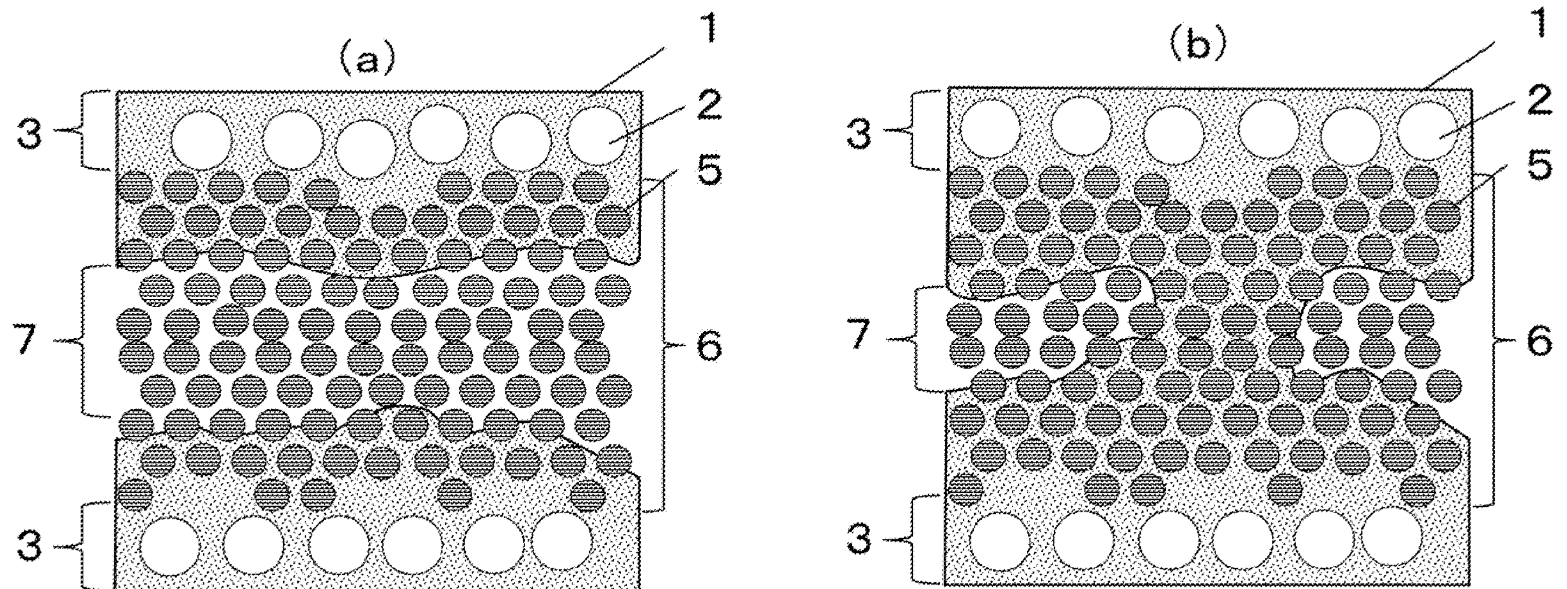

[Fig 2]
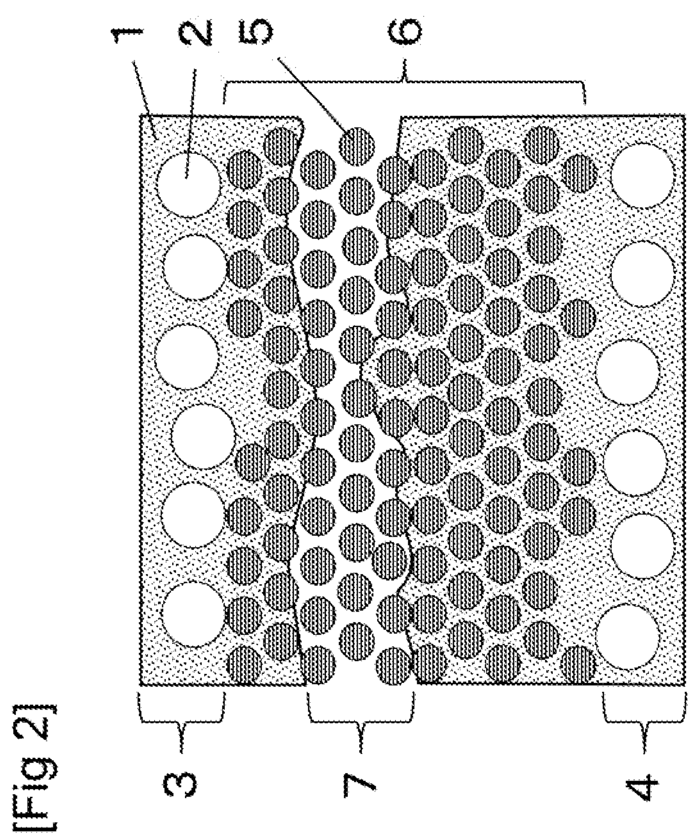

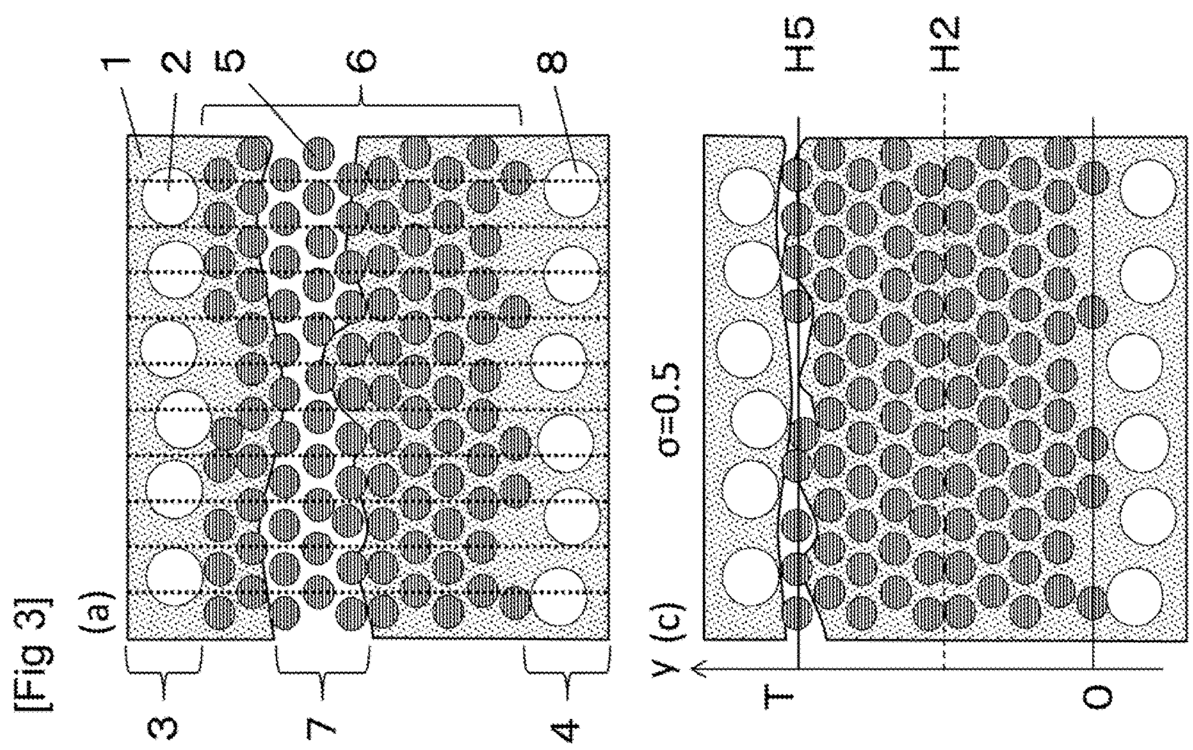
[Fig 3]
(a)
(b)
(c)
(d)
σ=0.25
σ=0.5
σ=0
1
2
5
6
8
3
7
4
T
H4
H5
H3
H2
O
x
y

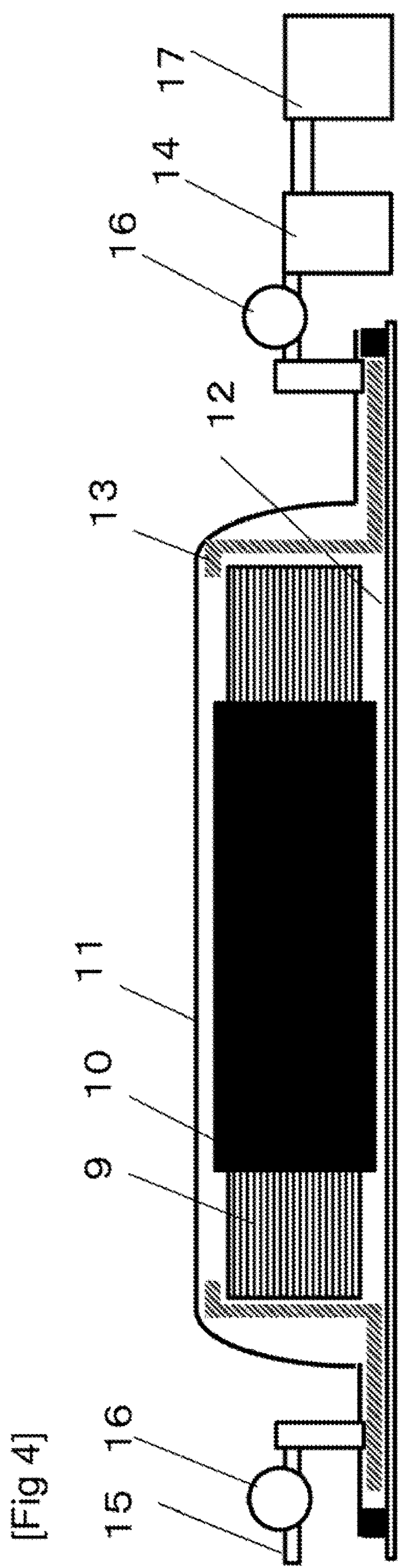
[Fig 4]
17
14
16
12
13
11
10
9
16
15

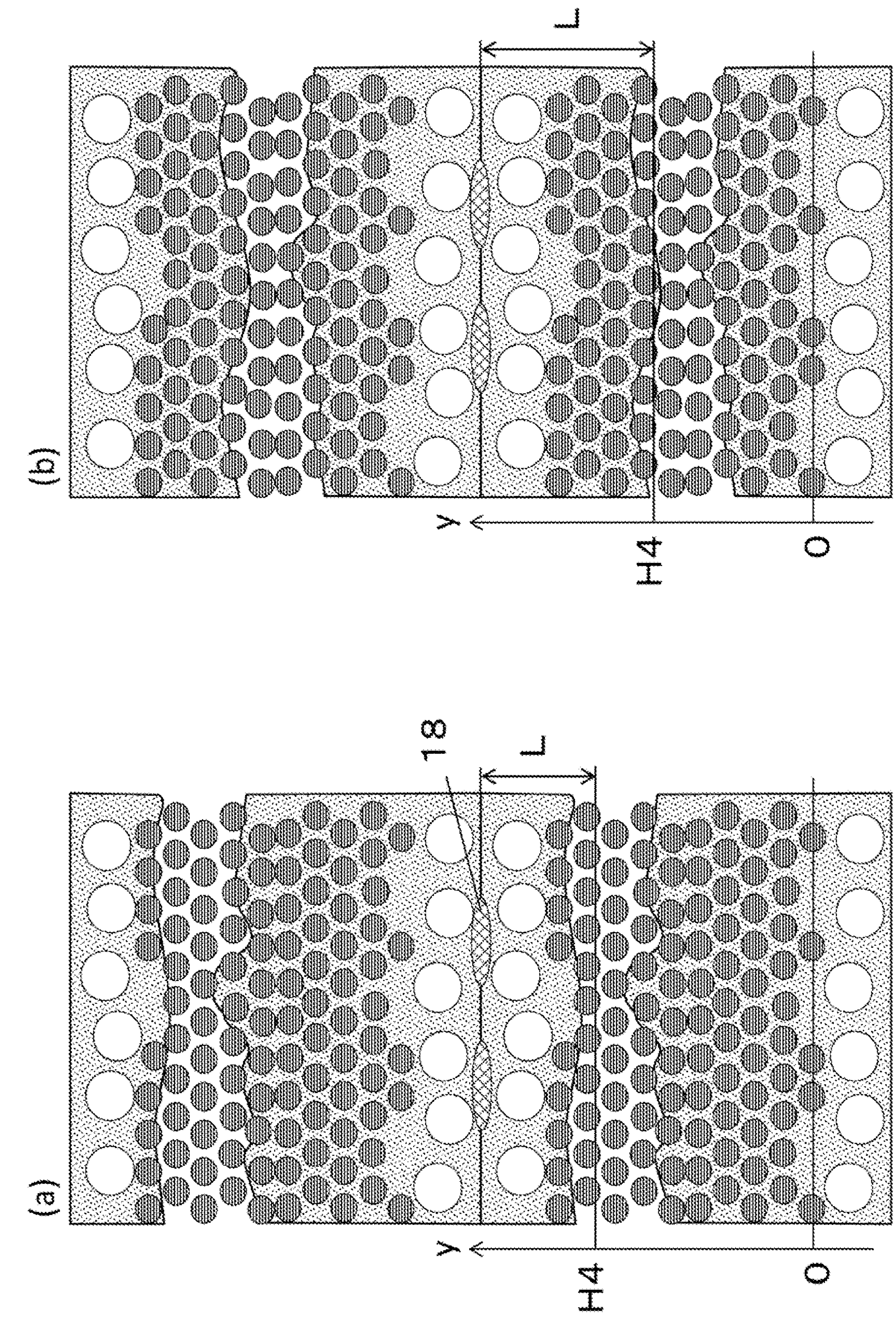
[Fig 5]
(a)
(b)
18
L
y
H4
O

PREPREG, PREPREG LAMINATE, AND FIBER-REINFORCED COMPOSITE MATERIAL

CROSS REFERENCE TO RELATED APPLICATIONS

This is the U.S. National Phase Application of PCT/JP2019/035730, filed Sep. 11, 2019, which claims priority to Japanese Patent Application No. 2018-173279, filed Sep. 18, 2018, the disclosures of each of these applications being incorporated herein by reference in their entireties for all purposes.

FIELD OF THE INVENTION

The present invention relates to a prepreg, a prepreg laminate, and a fiber-reinforced composite material.

BACKGROUND OF THE INVENTION

Fiber-reinforced composite materials that contain reinforced fibers such as carbon fibers and glass fibers and also contain a matrix resin are light in weight, yet excellent in mechanical properties such as strength and stiffness, heat resistance, and corrosion resistance. Therefore, fiber-reinforced composite materials have been applied to many fields, such as aerospace, cars, rail cars, ships, civil engineering and construction, and sports equipment. Above all, members for aircraft such as passenger aircraft and regional jets, and members for spacecraft such as artificial satellites, rockets, and space shuttles are required to have particularly excellent mechanical properties and heat resistance. Therefore, in these applications, carbon fibers that are lightweight and highly stiff are often used as reinforced fibers, and thermosetting resins excellent in heat resistance, elastic modulus, and chemical resistance, such as epoxy resins, are often used as matrix resins.

A main cause of deterioration of the mechanical properties of fiber-reinforced composite materials is the presence of voids inside the fiber-reinforced composite materials. When a mechanical load is applied to a fiber-reinforced composite material including voids, damages such as cracks and delamination are likely to occur, and these damages lower the mechanical strength and stiffness. Therefore, many studies have been made on materials/molding techniques for suppressing the voids from long ago.

Among methods for producing fiber-reinforced composite materials, autoclave molding is a molding method that can particularly suppress the generation of voids. This molding method can reduce the size of voids since the method can thermally cure the resin while pressurizing the material. Moreover, the molding method can significantly reduce the amount of voids since the method can suppress the vaporization of volatiles contained in the matrix resin. In the autoclave molding, however, a large initial investment is required to introduce a pressure vessel (autoclave) that can withstand high pressure. This is a main cause of the high cost for a technique intended for application to members for aerospace that are small in production volume.

Therefore, there have been proposed out-of-autoclave processes in which only a vacuum pump and an oven are used and no expensive pressurizing equipment such as an autoclave is used. In conventional out-of-autoclave processes, however, since volatiles in the epoxy resin are easily vaporized during heating, it is necessary to place the material under vacuum in a preheated state (for example, 60 to 120° C.) for a long time to remove the volatiles. Therefore, compared with the conventional autoclave molding, the out-of-autoclave process has problems that the molding time is long, voids tend to be left, and the failure rate is high.

As a means for solving such problems, Patent Document 1 proposes a semi-impregnated prepreg having unfilled regions for releasing volatiles and trapped air in the prepreg. The unfilled regions are formed by suppressing impregnation of the reinforced fiber layer with the matrix resin to provide un-impregnated regions inside the prepreg. Use of this technique can eliminate volatiles and trapped air that are the cause of generation of voids through the unfilled regions, and can produce a fiber-reinforced composite material with few voids in a short time, even in the case of molding in an atmospheric pressure environment using only a vacuum pump and an oven without using an autoclave.

Moreover, Patent Document 2 proposes, as for a fiber-reinforced composite material for aircraft/spacecraft, an interlayer toughening technique. In the interlayer toughening technique, a tough thermoplastic resin is shifted to a space between fiber layers to significantly improve the impact resistance. In actual operation of aircraft and spacecraft, there is a problem of damages caused by impact such as collision with birds or hail. Use of the interlayer toughening technique as described above, however, can significantly increase the impact strength of a fiber-reinforced composite material.

PRIOR ART DOCUMENTS

Patent Documents

Patent Document 1: U.S. Pat. No. 6,139,942

Patent Document 2: Japanese Patent Laid-open Publication No. H10-231372

SUMMARY OF THE INVENTION

However, even in the case where the semi-impregnated prepreg described in Patent Document 1 is used, it is necessary to provide large un-impregnated regions to ensure continuity of the unfilled regions in order to efficiently remove volatiles and reduce the frequency of void generation. However, if the un-impregnated regions are too large, in cutting the prepreg, there may be problems that the reinforced fibers are fluffed up from the cut surface, or the prepreg is torn in the out-of-plane direction, leading to deteriorated handleability of the prepreg. More specifically, there is a trade-off relationship between the reduction of possibility of void generation and the handleability of the prepreg, and a means for simultaneously solving these problems has not been proposed.

Further, the thermoplastic resin disposed between the layers as described in Patent Document 2 is generally in a solid or viscous state at the molding temperature. As a result, the technique has a problem that movement (hereinafter referred to as "flow") of the matrix resin is less likely to occur during molding, and that the resin is likely to be cured without impregnating into the unfilled regions included in the prepreg laminate, so that a large number of voids are generated.

In view of such background art, an object of the present invention is to provide a prepreg that is suitable for producing a fiber-reinforced composite material without using an autoclave in a short time, that generates fewer voids, that is capable of providing a fiber-reinforced composite material that exhibits excellent impact resistance, and that is excellent in handleability, and to provide a fiber-reinforced composite material including the prepreg.

The inventors of the present invention intensively studied to solve the above-mentioned problems, and as a result, found the following matter: shifting un-impregnated regions of a reinforced fiber layer of a prepreg to the vicinity of one surface of the prepreg significantly increases the continuity of the un-impregnated regions, so that air trapped at the time of lamination and volatiles contained in the matrix resin can be efficiently removed out of the prepreg laminate. The inventors of the present invention also found that as a result, even in the case of a prepreg having small un-impregnated regions, it is possible to form a fiber-reinforced composite material having a small amount of voids and is excellent in impact resistance in a short time.

Based on such findings, the present invention adopts the following means. Specifically, the prepreg according to embodiments of the present invention is a prepreg including: reinforced fibers [A] arranged in a layer form, an epoxy resin composition containing an epoxy resin [B] and a hardener [C], the epoxy resin composition being partially impregnated into the reinforced fibers [A], and a thermoplastic resin [D] that is insoluble in the epoxy resin [B] and is localized at surfaces on both sides of the prepreg. The prepreg has a degree of impregnation $\varphi$ with the epoxy resin composition of 30 to 95%, in a layer of the reinforced fibers [A], a region un-impregnated with the epoxy resin composition shifts to a side of either of the surfaces of the prepreg, and the prepreg has a shift parameter $\sigma$ that defines a degree of the shift in a range of $0.10<\sigma<0.45$.

Further, the prepreg with a release sheet of the present invention includes the prepreg according to embodiments of the present invention, and a release sheet attached to at least one of the surfaces of the prepreg.

Further, the prepreg laminate of the present invention includes a laminate of a plurality of the prepregs according to embodiments of the present invention, the prepregs being laminated so that the sides to which the region un-impregnated with the epoxy resin composition shifts are all on an upper side or all on a lower side.

Further, the fiber-reinforced composite material of the present invention includes a cured product of the prepreg according to embodiments of the present invention or the prepreg laminate of the present invention.

The prepreg of the present invention is suitable for producing a fiber-reinforced composite material without using an autoclave in a short time, generates fewer voids, is capable of providing a fiber-reinforced composite material that exhibits excellent impact resistance, and is excellent in handleability.

Moreover, the fiber-reinforced composite material of the present invention has fewer voids and exhibits excellent impact resistance.

BRIEF DESCRIPTION OF THE DRAWINGS

FIGS. 1(*a*) and 1(*b*) are schematic cross-sectional views showing a conventional prepreg for vacuum molding.

FIG. 2 is a schematic cross-sectional view showing an example of a prepreg according to an embodiment of the present invention for vacuum molding.

FIGS. 3(*a*) to 3(*d*) are schematic cross-sectional views of a prepreg showing a method for calculating a shift parameter $\sigma$.

FIG. 4 is a schematic view showing a configuration for measuring a penetration coefficient K in an in-plane direction of a prepreg.

FIGS. 5(*a*) and 5(*b*) are schematic views of a prepreg laminate showing a distance from trapped air present at a boundary between prepreg layers to a region un-impregnated with a resin.

DETAILED DESCRIPTION OF EMBODIMENTS OF THE INVENTION

The prepreg according to embodiments of the present invention is a prepreg including: reinforced fibers [A] arranged in a layer form, an epoxy resin composition containing an epoxy resin [B] and a hardener [C], the epoxy resin composition being partially impregnated into the reinforced fibers [A], and a thermoplastic resin [D] that is insoluble in the epoxy resin [B] and is localized at surfaces on both sides of the prepreg. The prepreg has a degree of impregnation $\varphi$ with the epoxy resin composition of 30 to 95%, in a layer of the reinforced fibers [A], a region un-impregnated with the epoxy resin composition shifts to a side of either of the surfaces of the prepreg, and the prepreg has a shift parameter $\sigma$ that defines a degree of the shift in a range of $0.1<\sigma<0.45$.

The reinforced fibers [A] used in the present invention may be any of glass fibers, Kevlar fibers, carbon fibers, graphite fibers, boron fibers and the like. Among them, carbon fibers are preferable for obtaining a particularly great weight reduction effect. Since carbon fibers are excellent in specific strength and specific elastic modulus, a great weight reduction effect is likely to be obtained.

As for the prepreg of the present invention, it is one of preferable aspects that the reinforced fibers [A] be continuous fibers that are arranged unidirectionally. Use of continuous fibers makes it possible to exhibit high mechanical strength compared to the case where short cut fibers are used. Furthermore, use of unidirectionally arranged fibers is likely to provide a fiber-reinforced composite material having a high fiber content and excellent in strength and stiffness. In the present invention, the phrase "arranged unidirectionally" means that in the observation of a surface of the prepreg with an optical microscope, 90% or more of all the fibers satisfy $\Theta-10°<\theta<\Theta+10°$, where $\theta$ is the orientation angle of each fiber, and $\Theta$ is the average of the orientation angles. In the calculation of the average value, a visual field of 0.5 mm is observed with an optical microscope, 30 fibers are arbitrarily selected from the fibers included in the visual field, and the average of the orientation angles of the fibers is used. Furthermore, the term "continuous fibers" in the present invention means reinforced fibers having a length at which the fibers are capable of exhibiting high strength, and specifically means reinforced fibers of 10 cm or more.

As for the prepreg of the present invention, it is another preferable aspect that the reinforced fibers [A] be in the form of a woven fabric. Use of reinforced fibers in the form of a woven fabric as a base material makes the base material itself easily deformable in the in-plane direction, and makes the base material easily shaped even into a shape having three-dimensional unevenness. Examples of the woven fabric form include bidirectional fabrics, multiaxial woven fabrics, knitted fabrics, and braids. In woven fabrics having these forms, the contact surface between the bundles of carbon fibers having different orientation directions is often located at the center in the thickness direction of the base material. In this case, it becomes easier to prevent cracks of the base material by shifting the un-impregnated region from the center in the thickness direction of the base material as in the present invention, as compared with the configuration in which the un-impregnated region is provided at the center as in the conventional semi-impregnated prepreg. Accordingly, a prepreg that is excellent not only in air permeability but also in handleability is likely to be obtained.

In still another preferable aspect of the prepreg of the present invention, the reinforced fibers [A] are a sheet-like short fiber base material. The short fiber base material is easier to stretch and easier to shape into a shape that is more complicated three-dimensionally than the woven fabric base material is. Examples of the short fiber base material include nonwoven fabrics, mats, and sheet molding compounds. The reinforced fibers included in this aspect preferably have a length of 12 mm or more, more preferably 25 mm or more, when priority is given to mechanical strength. This is because such reinforced fibers more easily exhibit high mechanical strength than reinforced fibers having a length less than 12 mm do. The reinforced fibers preferably have a length of 25 mm or less, more preferably 12 mm or less, when priority is given to stretchability of the base material. These preferable aspects can be appropriately selected according to the application or usage environment.

The epoxy resin [B] included in the present invention may be any epoxy resin as long as it has one or more glycidyl groups, but the epoxy resin [B] preferably has two or more glycidyl groups in one molecule. In the case of an epoxy resin having two or more glycidyl groups in one molecule, a cured product obtained by thermally curing a mixture of the epoxy resin and a hardener described later (hereinafter, the mixture is referred to as "epoxy resin composition") has a higher glass transition temperature than that of a cured product of an epoxy resin having one glycidyl group.

Examples of the epoxy resin that can be used in the present invention include bisphenol epoxy resins such as bisphenol A epoxy resin, bisphenol F epoxy resin, bisphenol AD epoxy resin, and bisphenol S epoxy resin, brominated epoxy resins such as tetrabromobisphenol A diglycidyl ether, an epoxy resin having a biphenyl skeleton, an epoxy resin having a naphthalene group, an epoxy resin having a dicyclopentadiene skeleton, novolac epoxy resins such as phenol novolac epoxy resin and cresol novolac epoxy resin, and glycidyl amine epoxy resins such as diaminodiphenylmethane epoxy resin, diaminodiphenyl sulfone epoxy resin, aminophenol epoxy resin, metaxylenediamine epoxy resin, 1,3-bis(aminomethyl)cyclohexane epoxy resin, and isocyanurate epoxy resin. Among them, an epoxy resin having three or more glycidyl groups in one molecule is preferable because it can exhibit a higher glass transition temperature and a higher elastic modulus.

These epoxy resins may be used singly, or as a mixture of a plurality of epoxy resins. In the case where a plurality of epoxy resins are used as a mixture, it is effective for controlling the fluidity of the matrix resin during molding into the prepreg to mix, for example, an epoxy resin that exhibits fluidity at any temperature equal to or lower than the curing start temperature of the epoxy resin composition with an epoxy resin that does not exhibit fluidity at the temperature. In the case where the fluidity is not controlled, for example, if the matrix resin before being gelated exhibits high fluidity during molding into the prepreg, orientation of the reinforced fibers may be disturbed, or the matrix resin may flow out of the reinforced fiber layer, so that the fiber mass content may be excessively increased and the mechanical properties of the obtained fiber-reinforced composite material may deteriorate. Combining a plurality of kinds of epoxy resins exhibiting various viscoelastic behaviors at some temperature is also effective for appropriately controlling the tackiness (adhesiveness) and drapability of the obtained prepreg.

In embodiments of the present invention, it is also effective to mix a thermoplastic resin compatible with the epoxy resin [B] in the epoxy resin. In particular, mixing a thermoplastic resin compatible with the epoxy resin [B] is effective for optimizing the tackiness of the obtained prepreg, controlling the fluidity of the matrix resin at the time of thermally curing the prepreg, and improving the toughness of the obtained fiber-reinforced composite material. Such thermoplastic resin is preferably a thermoplastic resin including a polyaryl ether skeleton. Examples of candidate thermoplastic resins including a polyaryl ether skeleton include polysulfones, polyphenylsulfones, polyethersulfones, polyetherimides, polyphenylene ethers, polyetheretherketones, and polyetherethersulfones. These thermoplastic resins including a polyaryl ether skeleton may also be used singly or in combination as appropriate. Among them, polyethersulfones and polyetherimides can be preferably used because they can impart toughness to the obtained fiber-reinforced composite material without deteriorating the heat resistance and mechanical properties of the fiber-reinforced composite material.

Moreover, in the thermoplastic resin including a polyaryl ether skeleton, it is effective to appropriately select the kind of a terminal functional group for controlling the compatibility and reactivity with the epoxy resin. Examples of selectable candidate terminal functional groups include primary amines, secondary amines, hydroxyl groups, carboxyl groups, thiol groups, acid anhydrides, and halogen groups (chlorine and bromine). In the case where a halogen group is selected among them as a terminal functional group, a prepreg excellent in preservation stability is likely to be obtained because the halogen group has low reactivity with the epoxy resin. On the other hand, when it is desired to increase the reactivity with the epoxy resin and shorten the curing time of the epoxy resin composition, it is effective to select a functional group such as a primary amine, a secondary amine, a hydroxyl group, a carboxyl group, a thiol group, or an acid anhydride as the terminal functional group.

The hardener [C] included in the present invention may be any compound having an active group capable of undergoing a cross-linking reaction with a glycidyl group. For example, a compound having an amino group, an acid anhydride group, or an azido group is suitable for the hardener [C]. Specific examples of the hardener [C] include various isomers of dicyandiamide, diaminodiphenylmethane, and diaminodiphenyl sulfone, aminobenzoic acid esters, various acid anhydrides, phenol novolac resin, cresol novolac resin, polyphenols, imidazole derivatives, aliphatic amines, tetramethylguanidine, thiourea added amines, methyl hexahydrophthalic acid anhydrides, other carboxylic acid anhydrides, carboxylic acid hydrazides, carboxylic acid amides, polymercaptans, boron trifluoride ethylamine complexes, and other Lewis acid complexes. These hardeners may also be used singly or in combination.

Among them, use of an aromatic diamine as the hardener [C] can provide a cured resin good in heat resistance. In particular, various isomers of diaminodiphenyl sulfone are most suitable because they can provide a cured resin good in heat resistance. The content of the aromatic diamine hardener is preferably an amount such that the number of active hydrogen atoms in the aromatic amine compound is within the range of 0.7 to 1.3 with respect to one glycidyl group in the epoxy resin composition, and the content is more preferably an amount such that the number of active hydrogen atoms is 0.8 to 1.2. Herein, "active hydrogen" refers to a hydrogen atom that binds to nitrogen, oxygen, and sulfur of an amino group, a hydroxyl group, and a thiol group in an organic compound. When the ratio of epoxy groups to active hydrogen atoms is within the predetermined range described above, a cured resin excellent in heat resistance and elastic modulus is obtained.

In addition, in the prepreg of the present invention, the hardener [C] may contain a hardener aid in order that the prepreg may exhibit high heat resistance and water resistance while being cured at a relatively low temperature. Herein, the hardener aid does not directly react with the glycidyl group of the epoxy resin [B] to form a cross-linked structure, but accelerates the cross-linking reaction between the epoxy resin [B] and the hardener [C] as a catalyst. Examples of the hardener aid include urea compounds such as 3-phenol-1,1-dimethylurea, 3-(3-chlorophenyl)-1,1-dimethylurea, 3-(3,4-dichlorophenyl)-1,1-dimethylurea, 2,4-toluenebis(dimethylurea), and 2,6-toluenebis(dimethylurea).

In addition, if the epoxy resin composition containing the epoxy resin and the hardener (and optionally containing the hardener aid) has a low viscosity, and the prepreg has a problem in handleability, it is also effective to subject the epoxy resin composition to a preliminary reaction to increase the viscosity. As the viscosity increases, appropriate adhesiveness can be imparted to the prepreg, and it becomes possible to improve the handleability or preservation stability of the prepreg.

The thermoplastic resin [D] included in embodiments of the present invention is insoluble in the epoxy resin [B] and is disposed at surfaces of the prepreg. In a prepreg laminate obtained by stacking a plurality of the prepregs and a cured product of the laminate, the thermoplastic resin [D] is localized to a space between fiber layers. In general, when an impact load is applied to a fiber-reinforced composite material from an out-of-plane direction, delamination develops between the layers of the fiber-reinforced composite material. In contrast, a fiber-reinforced composite material containing a thermoplastic resin between layers can realize excellent impact resistance because the tough thermoplastic resin is shifted to a space between the layers. The form of the thermoplastic resin may be any form as long as the thermoplastic resin can be arranged in a layer form, and may be any form such as particles, mats of short fibers, nonwoven fabrics, or films.

The thermoplastic resin [D] used in the present invention may or may not have crystallinity. Specific examples of the thermoplastic resin include polyamides, polycarbonates, polyacetals, polyphenyleneoxides, polyphenylenesulfides, polyarylates, polyesters, polyamideimides, polyimides, polyetherimides, polyimides having a phenyltrimethylindan structure, polysulfones, polyethersulfones, polyetherketones, polyetheretherketones, polyaramides, polyethernitriles, and polybenzimidazoles. Among them, polyamides are most preferable since they greatly improve impact resistance due to their excellent toughness. Among the polyamides, polyamide 12, polyamide 6, polyamide 11, a polyamide 6/12 copolymer, and polyamide fine particles formed to have a semi IPN structure (interpenetrating polymer network structure) (semi IPN polyamides) with the epoxy compound described in Example 1 of Japanese Patent Laid-open Publication No. H01-104624 have particularly good adhesive strength with the epoxy resin. Therefore, these polyamides are preferable because they can improve the delamination strength of the fiber-reinforced composite material at the time of drop impact to improve the impact resistance.

In the case where particles are used as the thermoplastic resin [D], the particles may have any of spherical, non-spherical, porous, whisker-like, and flaky shapes. However, it is most preferable to use spherical particles in order to ensure the impregnating property of the epoxy resin into the reinforced fibers and to reduce the influence of stress concentration induced by the difference in stiffness between the thermoplastic resin and the matrix resin. In order to retain these particles at the boundary between the layers in the fiber-reinforced composite material, it is preferable to increase the size of the particles to such an extent that the particles do not enter the gaps between adjacent reinforced fibers. Meanwhile, reducing the size of the particles can reduce the thickness of the resin layer at the boundary between the layers, and increase the fiber volume fraction. As for the particle size for achieving both the above-mentioned conditions, the average particle diameter is preferably within the range of 3 μm to 40 μm, more preferably within the range of 5 μm to 30 μm.

Meanwhile, in the case where fibers are used as the thermoplastic resin [D], the fibers may have either of short fiber and long fiber shapes. In the case of short fibers, a method of using fibers similarly to particles as described in Japanese Patent Laid-open Publication No. H02-069566, or a method of processing the fibers into a mat can be employed. In the case of long fibers, a method of arranging long fibers in parallel on a surface of a prepreg as described in Japanese Patent Laid-open Publication No. H04-292634, or a method of arranging fibers randomly as described in WO 94/016003 can be employed. It is also possible to process the fibers and use the fibers as a sheet-shaped base material such as the woven fabric as described in Japanese Patent Laid-open Publication No. H02-032843, or a nonwoven fabric material or a knitted fabric as described in WO 94/016003. Alternatively, it is also possible to employ a method of spinning short fiber chips, chopped strands, milled fibers, or short fibers into yarns, and then arranging the yarns in parallel or randomly to make a woven fabric or a knitted fabric.

Herein, the phrase "being insoluble in an epoxy resin" means that the thermoplastic resin [D] does not substantially dissolve in an epoxy resin containing the thermoplastic resin [D] dispersed therein when the epoxy resin is thermally cured. More specifically, the phrase means that in an observation using, for example, a transmission electron microscope, the thermoplastic resin [D] is not substantially reduced in size from the original size in the cured epoxy resin, and can be observed with a clear interface with the matrix resin.

The prepreg according to embodiments of the present invention is characterized in that the thermoplastic resin [D] insoluble in the epoxy resin [B] is localized at surfaces on both sides of the prepreg.

The resin mass content in the prepreg of the present invention is preferably within the range of 25 to 45%. Herein, the resin mass content refers to the mass percentage of resin components excluding the reinforced fibers [A] (the sum of the epoxy resin [B], the hardener [C], the thermoplastic resin [D], and other additives) in the prepreg. When the resin mass content is 25% or more, the matrix resin in the prepreg sufficiently flows, the un-impregnated regions of the reinforced fiber layer are easily filled with the matrix resin during curing of the prepreg, and voids are less likely to be generated in the obtained fiber-reinforced composite material. When the resin mass content is 45% or less, advantages of the fiber-reinforced composite material that it is excellent in specific strength and specific elastic modulus can be easily obtained. In view of these, a more preferable range of the resin mass content is 30 to 36%.

The prepreg according to embodiments of the present invention contains the epoxy resin composition partially impregnated into the reinforced fibers. Herein, the phrase "partially impregnated" means a state in which the prepreg includes, in the reinforced fiber layer, a region that is not impregnated with a resin (un-impregnated region).

In embodiments of the present invention, the prepreg has a degree of impregnation φ with the epoxy resin composition of 30 to 95%, preferably 50 to 95%, more preferably 60 to 90%. During cutting or laminating work of the prepreg, a high degree of impregnation φ with the epoxy resin composition in the prepreg can reduce the frequency of cracks of the prepreg starting from an un-impregnated region. Specifically, a degree of impregnation of 30% or more, preferably 50% or more, more preferably 60% or more provides a prepreg excellent in handleability. On the other hand, a low degree of impregnation φ with the epoxy resin composition in the prepreg can easily ensure the continuity of the un-impregnated regions for removing volatiles, so that the volatiles can be efficiently removed. As a result, it is possible to suppress the generation of voids in the fiber-reinforced composite material. In particular, setting the degree of impregnation to 95% or less, preferably 90% or less can provide a prepreg that is less likely to generate voids. Herein, the degree of impregnation φ with the epoxy resin composition in the prepreg is calculated as the average of the values of:

(number of reinforced fibers, to which the epoxy resin composition is attached, present per unit width)/(total number of reinforced fibers present per unit width)

in a 1-mm section of the prepreg in the in-plane direction. Herein, the "unit width" refers to the length of a cross section of the prepreg in the in-plane direction in one image, which is taken by a SEM described later at a magnification of 500× and not yet connected to any other image. As a method of counting the number of reinforced fibers, the prepreg is cut with a knife in a direction perpendicular to the surface of the prepreg, and the resulting fracture surface is observed with a SEM. At this time, the prepreg is cut in a direction such that the prepreg is cut at a surface in which the number of reinforced fibers included in the cut surface is the largest. For example, in the case of a prepreg in which reinforced fibers are arranged unidirectionally, the prepreg is cut at a surface orthogonal to the fibers. Alternatively, when it is difficult to identify the surface in which the number of reinforced fibers included in the cut surface is large as in the case of a short fiber base material, four cross sections of the prepreg at an interval of 45 degrees (0-degree direction, 45-degree direction, 90-degree direction, and 135-degree direction) are observed, and the cross section in which the number of carbon fibers included in the cut surface is the largest is adopted. In the measurement of the degree of impregnation φ of the prepreg, the observation magnification of the SEM is set to 500×, a connected image of the prepreg over 1 mm in the in-plane direction (for example, in the case of a prepreg in which reinforced fibers are arranged unidirectionally, a direction orthogonal to the fibers in the plane), the image including the upper and lower surfaces of the prepreg in the out-of-plane direction of the prepreg, is acquired so that the imaging areas do not overlap with each other, the degrees of impregnation φ of the prepreg are measured for the unit widths in the in-plane direction in the connected image acquired at the magnification of 500× (connected image including the upper and lower surfaces of the prepreg in the out-of-plane direction), and the average of the degrees of impregnation φ calculated for the unit widths over 1 mm in the in-plane direction in the image acquired at the magnification of 500× is calculated.

The prepreg according to embodiments of the present invention is characterized in that the thermoplastic resin [D] insoluble in the epoxy resin [B] is localized at surfaces on both sides of the prepreg, and that in a layer of the reinforced fibers [A], a region un-impregnated with the epoxy resin composition shifts to the side of either of the surfaces of the prepreg.

In order to describe the present invention more specifically, schematic views of a cross section of a conventional prepreg for vacuum molding are shown in FIGS. 1(*a*) and 1(*b*), and a schematic view of a cross section of the prepreg according to embodiments of the present invention is shown in FIG. 2. The following description is made with reference to these drawings.

In the conventional prepreg for vacuum molding, as shown in FIG. 1(*a*), an inter-formative layer 3 containing an epoxy resin composition 1 and a thermoplastic resin 2 insoluble in an epoxy resin is disposed at each surface of the prepreg. At the center of a reinforced fiber layer 6 including reinforced fibers 5 arranged in a layer form, an aggregate of reinforced fibers to which the epoxy resin composition is not attached, that is, an un-impregnated layer 7 is present. The un-impregnated layer 7 serves as a flow path for removing volatiles and trapped air, whereby a fiber-reinforced composite material with few voids can be obtained. However, when the degree of impregnation φ is increased in the conventional prepreg, depending on, for example, the density of the reinforced fibers or unevenness in wettability between the reinforced fibers and the resin, the resin impregnation distance (the distance from the surface of the reinforced fiber layer to an end of a resin-impregnated portion) may vary from site to site. Herein, in the case where the prepreg is impregnated with the epoxy resin composition from both the surfaces thereof, if any sites where the resin impregnation distance is long stochastically overlap each other, the epoxy resin composition in the inter-formative layers at both surfaces joins together to lose the continuity of the un-impregnated layer 7 as shown in FIG. 1(*b*). Therefore, the function of the un-impregnated layer as a flow path for removal of volatiles is lost, which is a cause of generation of voids.

In contrast, in the prepreg according to embodiments of the present invention, as shown in FIG. 2, an aggregate of reinforced fibers to which the epoxy resin composition is not attached, that is, an un-impregnated layer 7 is shifted to the side of an inter-formative layer 3 in a reinforced fiber layer 6. Herein, of the inter-formative layer 3 and an inter-formative layer 4 in FIG. 2, the one closer to the un-impregnated layer 7 is the inter-formative layer 3 (at a shifted side of the un-impregnated region), and the one farther from the un-impregnated layer 7 is the inter-formative layer 4 (at an opposite side to the un-impregnated region). In the prepreg according to embodiments of the present invention, impregnation of the epoxy resin composition into the reinforced fiber layer is suppressed at the side of the inter-formative layer 3 to make the end of the resin-impregnated portion smooth. Therefore, the resin surface of the resin-impregnated portion at the side of the inter-formative layer 3 is relatively smooth, and even if the impregnation distance at the side of the inter-formative layer 4 is varied from site to site, it is possible to ensure the continuity of the un-impregnated layer for removing the volatiles.

There are a plurality of methods as means for suppressing impregnation of the epoxy resin composition into the reinforced fiber layer at the side of the inter-formative layer 3. For example, it is effective to set the viscosity of the epoxy resin composition at the side of the inter-formative layer 3 higher than the viscosity of the epoxy resin composition at the side of the inter-formative layer 4. It is also effective to divide the impregnation process into two stages, and first impregnate the reinforced fiber layer with an epoxy resin film at the side of the inter-formative layer 4 at high temperature, and then impregnate the reinforced fiber layer with an epoxy resin film at the side of the inter-formative layer 3 at low temperature.

As described above, the prepreg according to embodiments of the present invention is characterized in that the impregnation distance of the epoxy resin composition that forms the inter-formative layer at one side of the prepreg is short, while the impregnation distance of the epoxy resin composition that forms the other inter-formative layer is long, and as a result, the prepreg may have high degree of impregnation while ensuring a flow path for continuous removal of volatiles. More specifically, the prepreg according to embodiments of the present invention is characterized in that the un-impregnated layer 7 shifts not to the center of the reinforced fiber layer 6 but to the side of the inter-formative layer 3.

Herein, in order to quantitatively express the fact that the un-impregnated layer shifts to the side of the inter-formative layer 3, the shift parameter $\sigma$ is defined by the following procedure. Herein, a method of calculating the shift parameter $\sigma$ is described with reference to the schematic views of a cross section of the prepreg in FIGS. 3(*a*) and 3(*b*). For convenience, in FIGS. 3(*a*) to 3(*d*), the inter-formative layer 3 side, which is the side with the shorter impregnation distance of the epoxy resin composition, is defined as the upper side, and the inter-formative layer 4 side, which is the side with the longer impregnation distance of the epoxy resin composition, is defined as the lower side.

First, as shown in FIG. 3(*a*), a region corresponding to a width of 1 mm is extracted from a cross-sectional image of the prepreg, and ten lines that are perpendicular to a reinforced fiber sheet and that divide the region into eleven equal portions in the width direction (equally dividing lines 8) are drawn. Then, a y-coordinate of an end of the reinforced fiber layer 6 on the inter-formative layer 4 side at one of the equally dividing lines is calculated, and the y-coordinate is defined as an end y-coordinate of the lower side of the reinforced fiber layer. The end y-coordinates of the lower side are calculated for the ten equally dividing lines 8 according to the same procedure, and the average of the calculated end y-coordinates is defined as 0 of the y-coordinate axis. Then, the average of end y-coordinates of the upper side is calculated according to the same procedure, and the y-coordinate is defined as T. T corresponds to the thickness of the reinforced fiber layer 6. A central y-coordinate H2 of the entire reinforced fiber layer present in the image is defined by H2=T/2. Further, y-coordinates of ends at the lower side of the reinforced fibers in the un-impregnated layer at the equally dividing lines 8 are obtained, and the average of the y-coordinates is defined as H3. Similarly, y-coordinates of ends at the upper side of the reinforced fibers in the un-impregnated layer at the equally dividing lines 8 are obtained, and the average of the y-coordinates is defined as H4. Note, however, that in the calculation of H3 and H4, when there is no un-impregnated fiber on any of the equally dividing lines 8, the equally dividing line 8 is excluded from the calculation of the average value. More specifically, when there is one equally dividing line 8 on which no un-impregnated fiber can be observed, H4 is calculated from the average of the coordinates of the remaining nine un-impregnated fibers.

At this time, a central coordinate H5 of the un-impregnated fibers is defined by H5=(H4+H3)/2. Using this value, the shift parameter $\sigma$ is defined by $$\sigma=(H5-H2)/T.$$

As for the parameter, when H3, which is the average of y-coordinates of ends at the lower side of the reinforced fibers in the un-impregnated layer at the equally dividing lines 8, coincides with H4, which is the average of y-coordinates of ends at the upper side of the reinforced fibers in the un-impregnated layer at the equally dividing lines 8, and the epoxy resin composition is substantially completely impregnated into the reinforced fibers at the side of the inter-formative layer 3 as shown in FIG. 3(*c*), H2=T/2, H5=T, and $\sigma$ is 0.5. Further, when the central coordinate of the reinforced fiber layer coincides with the central coordinate of the un-impregnated layer as shown in FIG. 3(*d*), H2=T/2, H5=T/2, and $\sigma$ is 0. In the present invention, the case where $\sigma$ is within the range of $0.05<\sigma<0.50$ is defined that the un-impregnated regions "shift to the side of the inter-formative layer 3". In the prepreg according to embodiments of the present invention, the shift parameter $\sigma$ is within the range of $0.10<\sigma<0.45$, preferably within the range of $0.20<\sigma<0.45$. When the shift parameter is within the above-mentioned range, the continuity of un-impregnated regions in the in-plane direction inside the prepreg laminate can be easily ensured, and the volatiles can be efficiently removed. As a result, generation of voids in the fiber-reinforced composite material can be suppressed.

In the prepreg of the present invention, it is preferable that the amount of reinforced fibers per unit area be 30 to 600 g/m$^2$. An amount of reinforced fibers of 30 g/m$^2$ or more eliminates the necessity of laminating a large number of sheets in order to form the prepreg into a fiber-reinforced composite material having a predetermined thickness, so that the workload is easily reduced. Further, an amount of reinforced fibers of 600 g/m$^2$ or less easily improves the drapability of the prepreg. Moreover, when producing a prepreg, or when thermally curing the prepreg, the epoxy resin composition may be easily impregnated into the unfilled regions in the reinforced fiber layer, and voids may be less likely to be generated. Furthermore, in order to achieve a continuous ventilation path while exhibiting a high degree of impregnation $\varphi$, it is better to have a smaller basis weight for shortening the resin impregnation distance. However, the amount of reinforced fibers per unit area is more preferably within the range of 100 to 300 g/m$^2$ since a thin fiber-reinforced composite material is susceptible to the influence of the density of fibers.

Further, in the prepreg of the present invention, the volatiles in the prepreg can be more efficiently removed by ensuring the continuity from a vacuum suction portion to the un-impregnated regions in the prepreg. For that purpose, it is preferable that the continuity of the un-impregnated regions in the prepreg be ensured, and the prepreg have air permeability. Herein, one of simple methods for ensuring the continuity of the un-impregnated regions is to reduce the degree of impregnation $\varphi$ to increase the un-impregnated regions. However, it is preferable to maintain a high degree of impregnation $\varphi$ in order to eliminate the unfilled regions by resin flow after the removal of volatiles and to suppress voids in the fiber-reinforced composite material, or to suppress cracks of prepregs in the out-of-plane direction during lamination of the prepregs. In order to realize these matters, in the prepreg of the present invention, the penetration coefficient K in the in-plane direction is preferably $1.1\times(1-\varphi/100)\times10^{-13}$ [$m^2$] or more ($\varphi$=degree of impregnation (%)), more preferably $1.5\times(1-\varphi/100)\times10^{-13}$ [$m^2$] or more.

Herein, the penetration coefficient K in the in-plane direction in the present invention is measured by a ventilation volume measurement method schematically shown in FIG. 4. The details of the measurement method are described below. First, in a prepreg laminate 9 in which ten layers of strip-like prepregs (fiber orientation direction: 100 mm, direction perpendicular to fibers: 50 mm) are laminated, ventilation of the prepregs in the thickness direction and at the side surfaces is blocked by a sealant 10 with only both ends of the prepregs in the fiber orientation direction being opened. The prepreg laminate 9 and the sealant 10 are sealed with a cover film 11 and a metal plate 12. An air flow path is secured along a glass tape 13 at the ends of the prepreg laminate 9. The laminate is opened to the atmospheric pressure at a ventilation opening 15 (the pressure of a pressure gauge 16 on the ventilation opening 15 side is defined as Pa (unit: Pa)), and the side of the laminate opposite to the ventilation opening 15 is placed in a vacuum environment using a vacuum pump 17 (the pressure of a pressure gauge 16 on the vacuum pump 17 side is defined as Pv (unit: Pa)). In this case, a pressure difference is generated between both the sides of the prepregs. The penetration coefficient K (unit: $m^2$) of the prepregs in the in-plane direction is defined by the following expression (1).

$$K = \frac{2\mu L Q_a}{A_P}\left(\frac{P_a}{P_a^2 - P_v^2}\right) \qquad \text{Expression (1)}$$

In the expression, p is the viscosity of the air (unit: Pa·s), L is the length of the prepreg (unit: m), Ap is the cross-sectional area of the prepreg (unit: $m^2$), and Qa is the air flow rate (unit: $m^3$/s) measured by an air flow meter 14.

The orientation direction in the present invention means a cross section of the prepreg in the Θ direction, where Θ is the average of orientation angles θ of the fibers obtained by observing the surface of the prepreg with an optical microscope. In the calculation of the average value Θ, 30 fibers are arbitrarily selected from fibers observed with an optical microscope, and the average of the orientation angles of the fibers is used.

In the prepreg according to embodiments of the present invention, the thermoplastic resin [D] insoluble in the epoxy resin [B] is required to be localized at the surfaces on both sides of the prepreg, and the prepreg may have a content of the thermoplastic resin [D] that is equal or different from each other at both the surfaces of the prepreg. Herein, the phrase that the thermoplastic resin [D] is "localized at the surfaces on both sides of the prepreg" means that the thermoplastic resin [D] is disposed in the vicinity of the surfaces on both sides of the prepreg, and does not enter the layer of the reinforced fibers [A]. The fact that the thermoplastic resin [D] does not enter the layer of the reinforced fibers [A] means that the thermoplastic resin [D] is absent between 0 and T on the y-coordinate axis defined in FIGS. 3(*a*) to 3(*d*). If it is difficult to distinguish between the epoxy resin [B] and the thermoplastic resin [D] by SEM observation, X-ray CT or the like may be used for observation. The determination of 0 and T on the y-coordinate axis defined in FIGS. 3(*a*) to 3(*d*), and the judgment that the thermoplastic resin [D] is absent between 0 and T on the y-coordinate axis are made using a connected image over a width of 1 mm in the in-plane direction of the prepreg (connected image of the range including the upper and lower surfaces of the prepreg in the out-of-plane direction) in a SEM image or an X-ray CT image similarly to the case of calculation of the degree of impregnation φ. If the amount of the thermoplastic resin [D] is different between both the surfaces of the prepreg, the amount of the thermoplastic resin [D] at the boundary between the prepreg layers may vary when the prepregs are laminated without distinction between the front and back surfaces. In this case, the mechanical properties of the obtained fiber-reinforced composite material may vary, or the quality of the laminate may deteriorate. Therefore, in the present invention, it is preferable that the prepreg have a content of the thermoplastic resin [D] that is equal at both the surfaces of the prepreg. This configuration has an advantage that equal amounts of the thermoplastic resin [D] can be secured at the boundary between arbitrary layers of the prepreg laminate even if the prepregs are laminated without distinction between the front and back surfaces. Herein, the phrase "the content of the thermoplastic resin [D] is equal at both the surfaces of the prepreg" means that the difference in the content of the thermoplastic resin [D] between both the surfaces of the prepreg falls within the range of 10% by mass of the total amount of the thermoplastic resin [D] contained in the prepreg.

An example of a method for measuring the amount of the thermoplastic resin [D] localized at the surfaces of the prepreg will be described. A prepreg is cut into a 10-cm square piece, and separated into two thin prepregs in the out-of-plane direction starting from a region un-impregnated with the resin. Dichloromethane in an amount sufficient for soaking the whole prepreg is put in a beaker, and one of the separated thin prepregs is immersed in dichloromethane in the beaker. The dichloromethane is stirred to dissolve the epoxy resin [B], then the reinforced fibers [A] are removed, the resulting dichloromethane solution is filtered through filter paper, and the weight of the thermoplastic resin [D] accumulated on the filter paper is measured. The other one of the separated thin prepregs is subjected to the measurement of the weight of the thermoplastic resin [D] by the same procedure. The amount of the thermoplastic resin [D] present on each surface can be measured by the procedure.

There are a plurality of methods as a method for producing the prepreg according to embodiments of the present invention.

An example of a relatively simple method for producing the prepreg according to embodiments of the present invention is a hot-melt process in which an epoxy resin film is stacked on a surface of a reinforced fiber sheet in which fibers are arranged in a sheet form, and the epoxy resin is impregnated into the reinforced fiber sheet under pressure/heating. The prepreg of the present invention can be obtained, for example, by sandwiching surfaces of a reinforced fiber sheet in which fibers are arranged in a sheet form with an epoxy resin film that forms the inter-formative layer 3 from one side of the sheet and an epoxy resin film that forms the inter-formative layer 4 from the other side of the sheet, and passing the resulting laminate between compression rollers. In addition, in order to further improve the continuity of un-impregnated regions in this production method, it is preferable to suppress the impregnation of the epoxy resin composition into the reinforced fiber layer at the side of the inter-formative layer 3. As a means for realizing this suppression, it is also effective to set the viscosity of the epoxy resin film at the side of the inter-formative layer 3 higher than the viscosity of the epoxy resin film at the side of the inter-formative layer 4. As another means, it is also effective to divide the impregnation process into two stages, and first impregnate the reinforced fiber layer with the epoxy resin film at the side of the inter-formative layer 4 at high temperature, and then impregnate the reinforced fiber layer with the epoxy resin film at the side of the inter-formative layer 3 at low temperature. Furthermore, it is also effective to combine these procedures.

Another method for producing the prepreg is a method of disposing, on surfaces of a reinforced fiber sheet in which fibers are arranged in a sheet form, an epoxy resin film containing only an epoxy resin composition on one side of the sheet and an epoxy resin film containing only an epoxy resin composition on the other side of the sheet, and further disposing a film of an epoxy resin composition containing a thermoplastic resin on both surfaces of the resulting laminate. Taking such means makes it easier to ensure the continuity of un-impregnated regions than in the above-mentioned method for producing the prepreg, and it is possible to further reduce the possibility of generation of voids.

The prepreg with a release sheet of the present invention includes the prepreg according to embodiments of the present invention, and a release sheet attached to at least one of the surfaces of the prepreg. Attaching the release sheet to the surface of the prepreg maintains the continuity of the un-impregnated regions during storage of the prepreg of the present invention. In addition, it is possible to suppress the progress of impregnation of the epoxy resin composition present near the surface of the prepreg into the reinforced fiber sheet, so that the removal efficiency of volatiles and trapped air through the un-impregnated regions can be maintained.

The release sheet in the present invention preferably has no pores or has only minute pores. More specifically, the release sheet in the present invention preferably has an air permeation coefficient of less than $10^{-6}$ $cm^2/cmHg$. For example, a release sheet having no pores or only minute pores, that is, a release sheet having an air permeation coefficient of less than $10^{-6}$ $cm^2/cmHg$, rather than a release sheet having many pores, such as a nonwoven fabric having large pores or a foamed sheet, is bonded to the prepreg, so that a non-contact part between the resin at the surface of the prepreg and the release sheet is reduced, and the resin at the surface of the prepreg is less likely to impregnate into the prepreg or into the nonwoven fabric or the foamed sheet even after a lapse of time.

The release sheet in the present invention preferably has a smooth surface. More specifically, it is preferable that the release sheet of the present invention have, as to the range of the release sheet that is bonded to the prepreg, an arithmetic mean height Sa defined by ISO 25178 of less than the diameter of the reinforced fibers in the prepreg. When a release sheet having a smooth surface, that is, a release sheet having a small arithmetic mean height Sa is bonded to the prepreg, the resin at the surface of the prepreg can easily come into contact with the release sheet even at a recess of the release sheet, and a sufficient effect of suppressing impregnation is likely to be obtained.

Examples of the release sheet include release paper and a plastic film, but are not limited thereto. Examples of the plastic film include a polyethylene film and a polytetrafluoroethylene film. Among them, a polyethylene film is preferable.

In the prepreg with a release sheet of the present invention, it is preferable that the release sheet be release paper, and the release paper be attached to a side of the surface of the prepreg to which the region un-impregnated with the epoxy resin composition does not shift. The prepreg with a release sheet can be obtained, for example, by the following method. Specifically, in the production of the prepreg, release paper may be used to support the epoxy resin film to be transferred to the reinforced fiber sheet. In this case, the above-mentioned prepreg with a release sheet can be obtained by leaving the release paper bonded to the prepreg after the transfer of the epoxy resin film. Use of the prepreg with a release sheet, particularly in the case of a thin prepreg, improves the handleability of the prepreg because the prepreg is supported by a relatively stiff sheet such as release paper, so that the prepreg is hardly bent due to its own weight. Further, the inter-formative layer 4 of the prepreg according to embodiments of the present invention has a long resin impregnation distance, and has higher flexural stiffness than an inter-formative layer of conventional prepregs for vacuum molding does. Therefore, when the release paper is bonded to a surface of the prepreg at the side of the inter-formative layer 4 (the side of the surface of the prepreg to which the region un-impregnated with the epoxy resin composition does not shift), cracks starting from the un-impregnated region are less likely to occur even when the release paper is separated during laminating work or the like, and the handleability of the prepreg is further improved.

When the release sheet is release paper, the thickness of the release paper is preferably 100 to 140 μm. When the thickness of the release paper is within the above-mentioned range, the above-mentioned effect exerted by the use of the release paper is likely to be obtained.

In the prepreg with a release sheet of the present invention, it is preferable that the release sheet be a plastic film, and the plastic film be attached to a side of the surface of the prepreg to which the region un-impregnated with the epoxy resin composition shifts. Since the inter-formative layer 3 of the prepreg of the present invention has a short resin impregnation distance, it is preferable to bond a plastic film that can be separated with weak force to a surface of the prepreg at the side of the inter-formative layer 3 (the side of the surface of the prepreg to which the region un-impregnated with the epoxy resin composition shifts).

When the release sheet is a plastic film, the thickness of the plastic film is preferably 10 to 40 μm. Further, the plastic film is more preferably a polyethylene film having a thickness of 10 to 40 μm.

It is more preferable in the prepreg with a release sheet of the present invention that one of the release sheets be release paper, the other release sheet be a plastic film, the release paper be attached to a side of the surface of the prepreg to which the region un-impregnated with the epoxy resin composition does not shift, and the plastic film be attached to a side of the surface of the prepreg to which the region un-impregnated with the epoxy resin composition shifts. With use of such a prepreg with a release sheet, the continuity of the un-impregnated regions is easily maintained, and the handleability during lamination of the prepregs is easily improved.

The prepreg laminate of the present invention includes a laminate of a plurality of the prepregs according to embodiments of the present invention, the prepregs being laminated so that the sides to which the layer un-impregnated with the epoxy resin composition shifts are all on an upper side or all on a lower side. In a cured product of the prepreg laminate, voids can be further suppressed. This is because, in the process of removing the air trapped between the prepreg layers during lamination, the shorter the distance from the un-impregnated layer in the reinforced fiber layer to the boundary between the prepreg layers is, the easier it is to remove the trapped air. This matter is illustrated in FIGS. 5(*a*) and 5(*b*). FIG. 5(*a*) shows a prepreg laminate in which the prepregs according to embodiments of the present invention are laminated so that the sides to which the un-impregnated layer shifts are on the upper side, and FIG. 5(*b*) shows a prepreg laminate in which conventional prepregs for vacuum molding are laminated in a conventional manner. Although both the prepreg laminates contain trapped air 18 between the prepreg layers, the distance L from the boundary between the prepreg layers to the un-impregnated layer is shorter in FIG. 5(*a*), and the air is more efficiently removed from the prepreg laminate in FIG. 5(*a*). If the prepregs are laminated without unifying the orientation of the sides to which the un-impregnated layer shifts, the removal of the trapped air present at a boundary between prepreg layers, which is sandwiched between resin layers having a long impregnation distance into the reinforced fiber layer, may be inefficient, and voids may be generated. From the viewpoint of shortening the distance from the boundary between the prepreg layers to the un-impregnated layer, it is preferable that the distance from H4, which is the upper end of the un-impregnated layer in FIGS. 3(*b*) and 3(*d*) or FIGS. 5(*a*) and 5(*b*), to the upper end of the prepreg be shorter.

The fiber-reinforced composite material of the present invention includes a cured product of the prepreg according to embodiments of the present invention or the prepreg laminate of the present invention. More specifically, the fiber-reinforced composite material of the present invention can be produced by thermally curing the prepreg of the present invention, or a prepreg laminate of the present invention, which is a laminate of the prepregs. The prepreg of the present invention is suitable for vacuum molding, but can also be used as a prepreg that is less likely to generate voids also in autoclave molding and press molding.

When the prepreg of the present invention is thermally cured in an oven, it is possible to obtain a fiber-reinforced composite material with few voids using, for example, the following molding method. A single-layer prepreg or a prepreg laminate obtained by laminating a plurality of prepregs is wrapped in a bag having an internal pressure of 11 kPa or less and maintained at a temperature of 20 to 70° C., so that volatiles are removed. The prepreg or the prepreg laminate is heated to the curing temperature while the pressure is maintained at 11 kPa or less. Herein, the volatiles are removed preferably under the conditions of a pressure of 0.1 kPa to 11 kPa, more preferably under the conditions of 0.1 kPa to 7 kPa. The higher the degree of vacuum is, that is, the lower the internal pressure is, the shorter the time taken for the removal of volatiles is. Setting the internal pressure to 11 kPa or less makes sufficient removal of volatiles in the prepreg easier, and voids are less likely to be generated in the obtained fiber-reinforced composite material.

In addition, the un-impregnated regions have to be filled with the epoxy resin composition at the time of molding, and it is effective to reduce the viscosity of the epoxy resin composition for this purpose. For example, it is preferable to hold the prepreg in a warmed state but at a temperature lower than the curing start temperature of the epoxy resin composition (a temperature of 40° C. to 130° C.) for a long time to fill the un-impregnated regions with the epoxy resin composition, and then heat the prepreg to the curing temperature of the epoxy resin composition (130° C. to 200° C.) to cure the epoxy resin composition.

EXAMPLES

Hereinafter, the present invention is described in detail by way of examples. However, the scope of the present invention is not limited to these examples. It is to be noted that the unit "part" in composition ratios means part by mass unless otherwise noted. Moreover, various properties were measured in an environment of a temperature of 23° C. and a relative humidity of 50% unless otherwise noted.

<Materials Used in Examples of the Present Invention and Comparative Examples>

(1) Component [A]: Reinforced Fibers

[Carbon fibers]

Carbon fibers (trade name: "TORAYCA (registered trademark)" T800S-24K-10E, number of filaments: 24,000, tensile strength: 5.9 GPa, tensile modulus: 290 GPa, tensile elongation: 2.0%, manufactured by Toray Industries, Inc.)

(2) Component [B]: Epoxy Resin

[Epoxy Resin]

Bisphenol A epoxy resin (trade name: "jER (registered trademark)" 825, manufactured by Mitsubishi Chemical Corporation)

Tetraglycidyl diaminodiphenylmethane (trade name: "Araldite (registered trademark)" MY721, manufactured by Huntsman Advanced Materials LLC)

(3) Component [C]: Hardener

[Aromatic Amine Hardener]

4,4'-Diaminodiphenyl sulfone (trade name: "SEIKACURE S", manufactured by Wakayama Seika Kogyo Co., Ltd.)

(4) Component [D]: Thermoplastic Resin Insoluble in Epoxy Resin [B]

[Thermoplastic Resin]

Polyamide fine particles obtained by the following production method (average particle diameter: 13 μm)

To a mixed solvent of 300 parts of chloroform and 100 parts of methanol, 90 parts of a transparent polyamide ("Grilamid (registered trademark)" TR55, manufactured by EMS-CHEMIE (Japan) Ltd.), 7.5 parts of an epoxy resin ("jER (registered trademark)" 828, manufactured by Mitsubishi Chemical Corporation), and 2.5 parts of a hardener ("TOHMIDE (registered trademark)" #296, manufactured by T&K TOKA CO., LTD.) were added to produce a homogeneous solution. Then, using a spray gun for coating, the obtained homogeneous solution was sprayed in the form of mist toward the liquid surface of 3000 parts of stirring n-hexane to precipitate the solute. The precipitated solid was separated by filtration and thoroughly washed with n-hexane, followed by vacuum drying at a temperature of 100° C. for 24 hours to produce spherical epoxy-modified polyamide particles having a semi IPN structure.

(5) Component Other than Components (1) to (4): Thermoplastic Resin Soluble in Epoxy Resin [B]

Polyethersulfone (trade name: "Sumika Excel (registered trademark)" PES5003P, manufactured by SUMITOMO CHEMICAL COMPANY, LIMITED)

<Evaluation Methods>

The measurements were performed on the epoxy resin composition and the prepreg of each of the examples according to the following measurement methods.

(1) Measurement of Degree of Impregnation φ of Prepreg with Epoxy Resin Composition A prepreg was cut with a knife, and the resulting fracture surface was observed with a SEM ("VHX (registered trademark)" D510 manufactured by KEYENCE CORPORATION). The degree of impregnation was calculated according to the above-mentioned technique by the expression: degree of impregnation φ=(number of carbon fibers to which the epoxy resin composition is attached present per unit width)/(total number of carbon fibers present per unit width).

(2) Measurement of Shift Parameter σ

A prepreg was cut with a knife, and the resulting fracture surface was observed with a SEM ("VHX (registered trademark)" D510 manufactured by KEYENCE CORPORATION). The coordinate of the central point of each carbon fiber was obtained, and the shift parameter σ was calculated according to the above-mentioned technique.

(3) Penetration Coefficient K in In-Plane Direction

Eight layers of strip-like prepregs (fiber orientation direction: 100 mm, direction perpendicular to fibers: 50 mm) were laminated according to the above-mentioned technique. The amount of air flowing in the fiber direction of the prepreg laminate, and pressures Pa and Pv at both ends of the prepregs were measured. The penetration coefficient K in the in-plane direction was also evaluated according to Expression 1.

(4) Handleability of Prepreg

Prepregs were cut with a knife in an environment of 23° C., and the prepregs were observed about fluffs generated at the ends of the prepregs, delamination of the prepregs in the out-of-plane direction during lamination, and ease of correction of bond during lamination. The relative merits of the prepregs were judged based on the following criteria.

A: good

B: the prepregs can be laminated, but fluffs are partially generated from the ends C: the prepregs can be laminated, but fluffs are generated from the ends, and correction of the bond takes ingenuity D: failure (5) Measurement of Void Fraction of Fiber-Reinforced Composite Material Sixteen prepregs each 300 mm long and 150 mm wide were unidirectionally laminated to form a prepreg laminate, and a 100 μm-thick PTFE film was disposed on both surfaces of the prepreg laminate. The resulting laminate was placed on a 10 mm-thick aluminum plate and covered with a nylon film. Furthermore, in an environment of 25° C., the degree of vacuum around the prepreg laminate was set to 3 kPa, and the prepreg laminate was left for 3 hours to remove volatiles. Then, while the degree of vacuum was maintained at 3 kPa, the prepreg laminate was heated to a temperature of 120° C. at a rate of 1.5° C./min and held for 180 minutes, and further heated to a temperature of 180° C. at a rate of 1.5° C./min and held for 120 minutes to cure the resin, whereby a fiber-reinforced composite material was obtained. From the fiber-reinforced composite material, three sample pieces each 10 mm long and 10 mm wide were cut out, and cross sections of the sample pieces were polished. Then, the sample pieces were observed with an optical microscope using a 50× lens so that the upper and lower surfaces of the fiber-reinforced composite material were included in the visual field to acquire images. The void fraction for each image was calculated by calculating the ratio between the void region and the total cross-sectional area in the acquired images. The same operation was carried out at three sites for each sample, for a total of nine sites, and the average of the nine void fractions was taken as the void fraction at each evaluation level.

(6) Evaluation of Impact Resistance (Measurement of Compression after Impact (CAI)) of Fiber-Reinforced Composite Material Twenty four unidirectional prepregs were laminated while being shifted by 45 degrees to produce a prepreg laminate having a laminated structure of $[+45°/0°/-45°/90°]_{3s}$. A 100 μm-thick PTFE film was disposed on both surfaces of the prepreg laminate. The resulting laminate was placed on a 10 mm-thick aluminum plate and covered with a nylon film. Furthermore, in an environment of 25° C., the degree of vacuum around the prepreg laminate was set to 3 kPa, and the prepreg laminate was left for 3 hours to remove volatiles. Then, the prepreg laminate was heated to a temperature of 120° C. at a rate of 1.5° C./min, and held for 180 minutes with the degree of vacuum being maintained at 3 kPa. Then, the prepreg laminate was heated to a temperature of 180° C. at a rate of 1.5° C./min, and held for 120 minutes to cure the prepregs, whereby a fiber-reinforced composite material was produced. From the fiber-reinforced composite material, a sample of 150 mm long and 100 mm wide was cut out, a drop impact of 6.7 J/mm was applied to the center of the sample in accordance with SACMA SRM 2R-94, and the compression after impact was determined.

Example 1

To a kneader, 60 parts by mass of "Araldite (registered trademark)" MY721 and 40 parts by mass of "jER (registered trademark)" 825 were added, and 12 parts by mass of "Sumika Excel (registered trademark)" PES5003P was further added, and the contents were thermally dissolved. Then, 46 parts by mass of "SEIKACURE S" as a hardener was kneaded to produce an epoxy resin composition (for a first film) containing no thermoplastic resin insoluble in an epoxy resin.

Similarly, 60 parts by mass of "Araldite (registered trademark)" MY721 and 40 parts by mass of "jER (registered trademark)" 825 were added to a kneader, and 12 parts by mass of "Sumika Excel (registered trademark)" PES5003P was further added, and the contents were thermally dissolved. Then, 45 parts by mass of polyamide fine particles as thermoplastic resin particles were kneaded. Then, 46 parts by mass of "SEIKACURE S" as a hardener was kneaded to produce an epoxy resin composition (for a second film) containing a thermoplastic resin insoluble in an epoxy resin.

Each of the produced two epoxy resin compositions was applied to release paper using a knife coater to produce resin films. The resin film containing no thermoplastic resin particles had an areal weight of 52 g/m$^2$, and the resin film containing the thermoplastic resin particles had an areal weight of 26 g/m$^2$. Herein, the resin film containing no thermoplastic resin particles is referred to as the first film, and the resin film containing a thermoplastic resin is referred to as the second film. Then, carbon fibers were arranged unidirectionally so that the fiber amount would be 190 g/m$^2$ to form a carbon fiber sheet, then the first film was bonded to one surface of the carbon fiber sheet, and the resin was impregnated into the carbon fiber sheet with a roller having a surface temperature of 100° C. being pressed against the resulting laminate. Then, the release paper attached to the first film was separated. Then, the second film containing the polyamide fine particles was bonded to both the surfaces of the carbon fiber sheet, and the resin was impregnated into the carbon fiber sheet with a roller having a surface temperature of 100° C. being pressed against the laminate. The release paper at the side of the laminate having only the second film bonded thereto was separated. Then, to the surface of the prepreg from which the release paper had been separated, a polyethylene film having a thickness of 23 μm was bonded as a plastic film. Thus, a unidirectional prepreg having a resin mass fraction of 35% was produced.

The release paper and the polyethylene film attached to the unidirectional prepreg were separated, and a plurality of the unidirectional prepregs were laminated. The method of lamination and the method for producing the fiber-reinforced composite material were as described in the item (6) of <Evaluation methods> as described above.

Examples 2 to 5: Verification of Effect of Degree of Impregnation on Ventilation Volume, Handleability, and Void Fraction A prepreg was produced by the same method as in Example 1 except that the surface temperature of the roller during the transfer of the first film was 110° C. in Example 2, 120° C. in Example 3, 130° C. in Example 4, and 140° C. in Example 5, and a fiber-reinforced composite material was obtained.

Comparative Examples 1 and 2

A prepreg was produced by the same method as in Example 1 except that the first film containing no thermoplastic particles was not prepared and the second film containing thermoplastic particles was produced to have an areal weight of 52 g/m$^2$, that the surface temperature of the roller was changed to 140° C. in Comparative Example 1 and 120° C. in Comparative Example 2, and that the surface to which the polyethylene film was bonded after the separation of the release paper was arbitrarily selected (the polyethylene film was bonded to either the upper surface or the lower surface of the prepreg), and a fiber-reinforced composite material was obtained.

Comparative Example 3

A prepreg was produced by the same method as in Example 1 except that the content of "Sumika Excel (registered trademark)" PES5003P in the epoxy resin composition for the first film and the epoxy resin composition for the second film was changed to 8 parts by mass, that the surface temperature of the roller during the transfer of the first film was changed to 130° C., and that the surface temperature of the roller during the transfer of the second film was changed to 120° C., and a fiber-reinforced composite material was obtained.

Comparative Example 4

A prepreg was produced by the same method as in Example 1 except that the content of "Sumika Excel (registered trademark)" PES5003P in the epoxy resin composition for the first film and the epoxy resin composition for the second film was changed to 6 parts by mass, that the surface temperature of the roller during the transfer of the first film was changed to 140° C., and that the surface temperature of the roller during the transfer of the second film was changed to 100° C., and a fiber-reinforced composite material was obtained.

Examples 1 to 4 and Comparative Examples 1 and 2

As for prepregs having comparable degrees of impregnation φ, in prepregs in which the positions of the centers of gravity of un-impregnated regions were shifted to one side of the prepregs, the prepregs had high ventilation volume, and the fiber-reinforced composite materials had a void fraction of 1% or less. It seems that the improvement in the removal efficiency of volatiles in the un-impregnated region led to a decrease in the amount of voids.

Example 5 and Comparative Examples 3 and 4

It was revealed from the comparison between Example 5 and Comparative Example 3 that the fiber-reinforced composite material of Example 5 exhibits low void fraction due to the degree of impregnation φ within the range of 30% to 95% and the penetration coefficient K in the in-plane direction of the prepreg of $1.1\times(1-\varphi/100)\times10^{-13}$ m$^2$ or more. In Comparative Example 4, many voids were generated. It seems that the voids were caused by too high a shift parameter σ to ensure the continuity of the un-impregnated regions, and the consequent low penetration coefficient.

TABLE 1

| | | | Example 1 | | Example 2 | | Example 3 | | Example 4 | | Example 5 | |
|---|---|---|---|---|---|---|---|---|---|---|---|---|
| | | | First film | Second film | First film | Second film | First film | Second film | First film | Second film | First film | Second film |
| Component [B] | Epoxy resin | Bisphenol A epoxy resin ("jER (registered trademark)" 825) | 40 | 40 | 40 | 40 | 40 | 40 | 40 | 40 | 40 | 40 |
| | | Tetradlycidyl diaminodiphenylmethane ("Araldite (registered trademark)" MY721) | 60 | 60 | 60 | 60 | 60 | 60 | 60 | 60 | 60 | 60 |
| Component [C] | Hardener | 4,4'-Diaminodiphenyl sulfone (SEIKACURE S) | 46 | 46 | 46 | 46 | 46 | 46 | 46 | 46 | 46 | 46 |
| Component [D] | Thermoplastic resin insoluble in epoxy resin [B] | Polyamide fine particles | — | 45 | — | 45 | — | 45 | — | 45 | — | 45 |
| Component other than components [A] to [D] | Thermoplastic resin | Polyethersulfone ("Sumika Excel (registered trademark)" PES5003P) | 12 | 12 | 12 | 12 | 12 | 12 | 12 | 12 | 12 | 12 |
| | Surface temperature of roller (° C.) | | 100 | 100 | 110 | 100 | 120 | 100 | 130 | 100 | 140 | 100 |
| Properties of prepreg | Degree of impregnation φ (%) of prepreg with thermosetting resin composition | | 62 | | 68 | | 74 | | 84 | | 93 | |
| | Shift parameter σ | | 0.26 | | 0.32 | | 0.34 | | 0.36 | | 0.42 | |
| | Penetration coefficient K in in-plane direciton (m$^2$) | | $1.3\times10^{-13}$ | | $8.7\times10^{-14}$ | | $7.4\times10^{-14}$ | | $6.1\times10^{-14}$ | | $1.3\times10^{-14}$ | |
| | Handleability | | A | | A | | A | | A | | A | |

TABLE 1-continued

| | | Example 1 First film | Example 1 Second film | Example 2 First film | Example 2 Second film | Example 3 First film | Example 3 Second film | Example 4 First film | Example 4 Second film | Example 5 First film | Example 5 Second film |
|---|---|---|---|---|---|---|---|---|---|---|---|
| Properties of reinforced fiber composite material | Void fraction (%) | 0.1 | | 0.2 | | 0.4 | | 0.6 | | 1.3 | |
| | CAI (MPa) | 276 | | 280 | | 278 | | 276 | | 256 | |

TABLE 2

| | | | Comparative Example 1 Second film | Comparative Example 2 Second film | Comparative Example 3 First film | Comparative Example 3 Second film | Comparative Example 4 First film | Comparative Example 4 Second film |
|---|---|---|---|---|---|---|---|---|
| Component [B] | Epoxy resin | Bisphenol A epoxy resin (“jER (registered trademark)” 825) | 40 | 40 | 40 | 40 | 40 | 40 |
| | | Tetradlycidyl diaminodiphenylmethane (“Araldite (registered trademark)” MY721) | 60 | 60 | 60 | 60 | 60 | 60 |
| Component [C] | Hardener | 4,4'-Diaminodiphenyl sulfone (SEIKACURE S) | 46 | 46 | 46 | 46 | 46 | 46 |
| Component [D] | Thermoplastic resin insoluble in epoxy resin [B] | Polyamide fine particles | 23 | 23 | — | 45 | — | 45 |
| Component other than components [A] to [D] | Thermoplastic resin | Polyethersulfone (“Sumika Excel (registered trademark)” PES5003P) | 12 | 12 | 8 | 8 | 6 | 6 |
| | Surface temperature of roller (° C.) | | 140 | 120 | 130 | 120 | 140 | 100 |
| Properties of prepreg | Degree of impregnation φ (%) of prepreg with thermosetting resin composition | | 88 | 70 | 96 | | 94 | |
| | Shift parameter σ | | 0.01 | 0.01 | 0.40 | | 0.47 | |
| | Penetration coefficient K in in-plane direciton ($m^2$) | | $4.7 \times 10^{-15}$ | $3.2 \times 10^{-14}$ | $4.1 \times 10^{-15}$ | | $5.0 \times 10^{-15}$ | |
| | Handleability | | A | A | A | | A | |
| Properties of reinforced fiber composite material | Void fraction (%) | | 7.4 | 3.8 | 8.9 | | 4.8 | |
| | CAI (MPa) | | 187 | 248 | 165 | | 170 | |

DESCRIPTION OF REFERENCE SIGNS

1: Epoxy resin composition
2: Thermoplastic resin insoluble in epoxy resin
3: Inter-formative layer (at shifted side of un-impregnated region)
4: Inter-formative layer (at opposite side to un-impregnated region)
5: Reinforced fiber
6: Reinforced fiber layer
7: Un-impregnated layer
8: Equally dividing line
9: Prepreg laminate
10: Sealant
11: Cover film
12: Metal plate
13: Glass tape
14: Air flow meter
15: Ventilation opening
16: Pressure gauge
17: Vacuum pump
18: Trapped air present at boundary between prepreg layers

The invention claimed is:

1. A prepreg comprising:

reinforced fibers [A] arranged in a layer form, an epoxy resin composition containing an epoxy resin [B] and a hardener [C], the epoxy resin composition being partially impregnated into the reinforced fibers [A], and a thermoplastic resin [D] that is insoluble in the epoxy resin [B] and is localized at surfaces on both sides of the prepreg, wherein the prepreg has a degree of impregnation φ with the epoxy resin composition of 30 to 95%, in a layer of the reinforced fibers [A], a region un-impregnated with the epoxy resin composition shifts to a side of either of the surfaces of the prepreg, and the prepreg has a shift parameter a that defines a degree of the shift in a range of $0.10<\sigma<0.45$.

2. The prepreg according to claim 1, having a penetration coefficient K in an in-plane direction of $1.1\times(1-\varphi/100)\times 10^{-13}$ [$m^2$] or more.

3. The prepreg according to claim 1, wherein the reinforced fibers [A] are continuous fibers that are arranged unidirectionally.

4. The prepreg according to claim 1, wherein the reinforced fibers [A] are in a form of a woven fabric.

5. The prepreg according to claim 1, having a content of the thermoplastic resin [D] that is equal at both the surfaces of the prepreg.

6. A prepreg with a release sheet comprising:

the prepreg according to claim 1, and a release sheet attached to at least one of the surfaces of the prepreg.

7. The prepreg with a release sheet according to claim 6, wherein the release sheet is release paper, and the release paper is attached to a side of the surface of the prepreg to which the region un-impregnated with the epoxy resin composition does not shift.

8. The prepreg with a release sheet according to claim 6, wherein the release sheet is a plastic film, and the plastic film is attached to a side of the surface of the prepreg to which the region un-impregnated with the epoxy resin composition shifts.

9. A prepreg laminate comprising a laminate of a plurality of the prepregs according to claim 1, the prepregs being laminated so that the sides to which the region un-impregnated with the epoxy resin composition shifts are all on an upper side or all on a lower side.

10. A fiber-reinforced composite material comprising a cured product of the prepreg laminate according to claim 9.

11. A fiber-reinforced composite material comprising a cured product of the prepreg according to claim 1.

* * * * *